Patented Sept. 10, 1935

2,013,651

UNITED STATES PATENT OFFICE 2,013,651

ALGIN COMPOSITION CONTAINING LATEX

Bernard F. Erdahl, Duluth, Minn.

No Drawing. Application March 5, 1928,
Serial No. 259,376

3 Claims. (Cl. 134—17)

My invention relates to a composition comprising latex and algin compounds adapted for a wide variety of uses.

In my prior patents, No. 1,415,849, No. 1,415,850 and No. 1,625,301, I have set forth the production of algin compounds which produce films which are insoluble, cohesive, adhesive, non-porous, and impermeable. Briefly, it may be stated that these compounds are produced by treating an algin base with a suitable reacting component, eliminating the impurities from the reaction product, and adding a substance capable of transforming the reaction product into an alginate gel. More specifically, ammonium alginates, metal alginates, double metal alkali alginates, and ammonium metal alginates may be produced. These alginates may be fortified by adding an appropriate agent. For example, waxes, such as beeswax, dispersed in a suitable dispersing agent, such as ammonium hydroxide, may be used to effect fortification of the algin compounds. In my latest Patent No. 1,625,301, the production of aged alginic acid is disclosed and particularly directions are given for producing a fortified alginate by dissolving the aged algin compound in an ammonia emulsion of waxes and oils. In the production of alginates it is desirable that all the reactions be formed in the cold and that all impurities be removed, as pointed out in my prior patents. It is desired to indicate that in the preferred form of my invention it is the algin products described in my prior patents that are preferably mixed with the latex. However, more broadly, I contemplate the incorporation of latex in any algin compound. According to my invention, alginate fillings, coatings, or films may be made which are not only insoluble, cohesive, adhesive, non-porous, water repellent, and acid resisting, but are additionally elastic. This is accomplished by adding to the algin, alginic acid, an alginate, or a fortified alginate as hereinafter more particularly pointed out, a latex solution or dispersion. Preferably, rubber latex is dispersed in ammonia hydroxide. However, it is desired to specifically point out that my invention is not limited to the use of ammonia as a dispersion agent. Other dispersion agents may be used but ammonium hydroxide has given the most satisfactory results.

My algin latex mixture may be used to produce thin coatings or films or thick coatings or films. The thickness of the coating or film may be regulated by diluting the fortified solution of the alginate or other algin compounds or by controlling the concentration of the latex dispersion. Further, the mixture itself may be diluted with water to control the concentration of its components. The relatively thin films may be used for impregnating canvas and textiles which may be manufactured into raincoats, automobile tops, and similar articles. Thick films may be obtained, as pointed out, or by using a more concentrated solution of the mixture components. Gaskets and sealing compounds may be produced from the mixture and used in containers of various kinds, such as glass jars, tin cans, paper receptacles and the like. Bottoms and tops of tin cans or can ends may be lined, preferably with gaskets, made from my algin latex mixture. In using the mixture, it is applied to the object and allowed to set. Thereafter, it is heated to liberate any volatile compounds and more particularly, the ammonia. Temperatures varying between 120° and 140° F. are satisfactory although, of course, higher or lower temperatures may be employed.

It is also within the province of my invention to produce a material which compares favorably with rubber as hereinafter will be pointed out more specifically.

Cellular or pervious materials or articles may be treated with the mixture of latex and an algin base, the algin base being preferably fortified, as previously set forth, to form a filling, coating, envelope or impregnation. The extent to which the filling permeates the cells or interstices of the material and becomes interlocked with the same depends upon the method used to produce the material and fabricate the article. Both inorganic and organic cellular or semi-cellular or pervious materials may be treated with my mixture.

In order to clearly disclose my invention, the following examples are given.

In general it may be stated that the elastic properties of the filling, coating, or film on the articles treated is governed by the amount of latex present or stated differently, by the ratio between the algin compound and the latex component. For example, alginic acid, ammonium alginate, metal alginates, such as copper, aluminum, zinc, etc., or their double salts, such as ammonium alginate of iron, copper, aluminum, and zinc, may be mixed with 20 to 60% of a rubber latex emulsion, preferably an ammonia emulsion thereof, these percentages depending on the viscosity of the latex emulsion or dispersion and also on the viscosity of the algin base.

For some purposes a rubber-like product is desired, of a comparatively hard consistency.

Such a product may be prepared by utilizing copper ammonium alginate, which may be fortified with a suitable fortifying agent, including those set forth in my prior patents. Preferably, the copper ammonium alginate is fortified with formalin and mixed with a 20 to 40% latex dispersion, preferably an ammonia dispersion. The exact percentage of latex dispersion used depends on the viscosity thereof. In the above example the metal alginate from which the ammonium metal alginate is prepared may be, and preferably is, aged in accordance with the disclosure of my prior Patent No. 1,625,301.

When it is desired to make a softer rubber product which may be suitable for use as a gasket or for coating special articles, copper ammonium alginate may be provided by mixing therewith an emulsion of beeswax and the fortified alginate is thereafter mixed with a suitable emulsion of latex, the latter being preferably dispersed in ammonium hydroxide. Instead of proceeding, as above, copper ammonium alginate may be fortified with an ammonia emulsion of beeswax and paraffin oil, and the fortified alginate added to the latex emulsion. Further, ammonium alginate may be fortified with an ammonia emulsion of beeswax and the fortified alginate added to the latex emulsion. The exact percentage of the latex emulsion which is added preferably varies between 30 to 60%, depending upon the viscosity of the ammonia emulsion of the latex. Stated differently, about 30 to 60% of the latex emulsion will be added to 70 to 40% of the fortified algin.

It is desired to indicate that the wax emulsions which are incorporated in the latex alginate mixture function to make the elastic end-product both softer and more water-proof and, therefore, should be used when these qualities are most desired.

In order to make a product simulating regular rubber, a concentrated ammoniacal solution of rubber latex is dispersed in a concentrated ammoniacal solution of an algin compound; for example, the metal alginates or alginic acid. There results therefrom a highly viscous mixture and this mixture is poured into forms, care being taken to work out any air bubbles that may have imprisoned themselves in the mixture. The poured mass is allowed to set and dry at a temperature adapted to eliminate the volatile components of the mixture, including the ammonia. A temperature of 120° F. has been found to give satisfactory results. It may be stated that the entire operation is carried out in the cold, that is, at temperatures preferably varying between 40° F. and 80° F. During the drying process, the ammonia or any other volatile dispersing agent which may have been used is liberated, effecting a solidification and polymerization of the alignates as well as the latex.

In general, it may be stated that the above mixtures may be made by simply adding the rubber latex directly to ammoniacal solutions of the metal alginates or alginic acid which, preferably, have been suitably fortified. However, it is preferred that the latex be first dispersed in a solution of ammonium hydroxide forming an ammonia emulsion of latex and the latter then added to the fortified solution of the ammoniacal alginates. The viscosity of the latex algin mixture may be controlled by diluting either the latex dispersion, the algin dispersion, or the mixture itself, with an appropriate amount of water. It is desired to point out that the latex algin mixture is an excellent substitute for rubber. However, the cost of producing the product as compared with regular rubber is materially reduced since a smaller amount of latex is used than would be used in regular rubber and the mixture is manufactured by a cold process.

In making the mixture there may be added thereto suitable fillers or body materials. specifically, zinc oxide, litharge, magnesia, colloidal silica, titanium oxide, $Ti_2O_3$, alumina, $Al_2O_3$, and carbon black, may be used. The latex algin mixture may have added thereto an organic or inorganic accelerator and vulcanized to produce a product simulating vulcanized rubber.

My composition may be made by mixing latex with an ammonium metal alginate, such as ammonium zinc alginate, ammonium iron alginate, or ammonium aluminum alginate, and used to treat containers of various kinds, including the tops and bottoms of tin cans or can ends. When using this mixture, it is usually desirable to add a body material or filler and in this connection, most satisfactory results have been obtained by using diatomaceous earth or colloidal silica.

My composition may also be made by mixing latex with a double metal alkali alginate, such as ammonium sodium alginate and preferably adding a filler, such as above set forth. This mixture may be used to treat the bottoms or tops of tin cans or can ends.

It may be mentioned that latex is a definite article of commerce and usually is transported to this country with the addition of a preservative or dispersion agent, such as ammonia to prevent coagulation during transportation. This effects a stabilization of the latex emulsion. Depending on the character of the latex, sometimes it is necessary to add more ammonia than at other times in order to prevent the coagulation during transportation. The latex, as delivered in this country, has a viscosity usually varying between that of heavy molasses and a very thin syrup.

This application is a continuation in part of my application Serial No. 166,818, filed February 8, 1927.

I claim:

1. A composition of matter comprising alginic acid and rubber latex.

2. A composition adapted for impregnating textile fabrics comprising latex and alginic acid in the relative proportions of about 60% of the former and 40% of the latter.

3. A composition comprising alginic acid and latex in such relative proportions as to produce a consistency adapted for the impregnation of textile fabrics.

BERNARD F. ERDAHL.